(12) United States Patent
Yamamoto et al.

(10) Patent No.: US 8,912,274 B2
(45) Date of Patent: Dec. 16, 2014

(54) WATER-DISPERSIBLE VARNISH (75) Inventors: Shigeyuki Yamamoto, Tokyo (JP);
Yoshinori Shirafuji, Tokyo (JP);
Toshifumi Kanri, Tokyo (JP); Satoru Toyama, Tokyo (JP); Nobuyuki Kamegawa, Sanda (JP); Yukio Hidaka, Sanda (JP)

(73) Assignees: Mitsubishi Electric Corporation, Tokyo (JP); Ryoden Kasei Co., Ltd., Sanda-shi (JP)

( * ) Notice: Subject to any disclaimer, the term of this patent is extended or adjusted under 35 U.S.C. 154(b) by 151 days.

(21) Appl. No.: 13/388,910

(22) PCT Filed: Aug. 3, 2009

(86) PCT No.: PCT/JP2009/063745
§ 371 (c)(1),
(2), (4) Date: Apr. 16, 2012

(87) PCT Pub. No.: WO2011/016103
PCT Pub. Date: Feb. 10, 2011

(65) Prior Publication Data
US 2012/0189768 A1    Jul. 26, 2012

(51) Int. Cl.
*C08F 222/10* (2006.01)
*C08G 59/14* (2006.01)
*C09D 133/06* (2006.01)
*C09D 151/08* (2006.01)
*C08F 290/06* (2006.01)
*C08G 59/17* (2006.01)
*C08L 63/10* (2006.01)
*H02K 3/30* (2006.01)

(52) U.S. Cl.
CPC .............. *H02K 3/30* (2013.01); *C08G 59/1494* (2013.01); *C09D 133/068* (2013.01); *C09D 151/08* (2013.01); *C08F 290/064* (2013.01); *C08G 59/1466* (2013.01); *C08L 63/10* (2013.01)
USPC .............. 524/556; 523/402; 522/84; 427/104

(58) Field of Classification Search
CPC .............. C08F 290/064; C08F 222/10; C08G 59/1466; C08G 59/1494; C08L 63/10
USPC .............. 524/556; 523/402; 522/84; 427/104
See application file for complete search history.

(56) References Cited

U.S. PATENT DOCUMENTS 5,006,279 A * 4/1991 Grobbel et al. ............... 510/206
5,984,647 A * 11/1999 Miyamoto et al. .......... 417/410.1

FOREIGN PATENT DOCUMENTS

CN    1202757    12/1998
JP    60 41098    9/1985

(Continued)

OTHER PUBLICATIONS

Combined Chinese Office Action and Search Report issued Jan. 4, 2013, in Chinese Patent Application No. 200980160763.X with English translation and with English translation of category of cited documents.

(Continued)

*Primary Examiner* — Michael M Bernshteyn
(74) *Attorney, Agent, or Firm* — Oblon, Spivak, McClelland, Maier & Neustadt, L.L.P.

(57) ABSTRACT

To obtain water-dispersible varnish used in an alternative refrigerant/refrigerating machine oil refrigerant system or a natural refrigerant/refrigerating machine oil refrigerant system, the water-dispersible varnish being capable of solving two problems, namely, reducing the volatile components and the like during thermal curing and resistance of the cured varnish to the refrigerant system,
wherein the water-dispersible varnish has a specific thermosetting resin as base polymer, a specific vinyl monomer as reactive diluent, organic peroxide as reaction initiator, and water mixed therein.

18 Claims, 2 Drawing Sheets

(56) References Cited

FOREIGN PATENT DOCUMENTS

| JP | 1 42486 | 9/1989 |
|---|---|---|
| JP | 9 165434 | 6/1997 |
| JP | 10 101770 | 4/1998 |
| JP | 10 285886 | 10/1998 |
| JP | 3904516 | 1/2007 |
| JP | 2009-277541 A | 11/2009 |
| JP | 2009277541 A * | 11/2009 |
| RU | 2337120 C2 * | 10/2008 |

OTHER PUBLICATIONS

International Search Report Issued Nov. 2, 2009 in PCT/JP09/63745 Filed Aug. 3, 2009.

Office Action issued Oct. 29, 2013 in Japanese Patent Application No. 2011-525703 with English language translation.

* cited by examiner

WATER-DISPERSIBLE VARNISH

CROSS REFERENCE TO RELATED APPLICATION

This application is a 371 of PCT/JP2009/063745, filed on Aug. 3, 2009.

TECHNICAL FIELD

The present invention relates to water-dispersible varnish, an electric compressor using the water-dispersible varnish and a method of manufacturing the electric compressor, and a refrigeration and air-conditioning apparatus equipped with the electric compressor.

BACKGROUND ART

Figure 1:
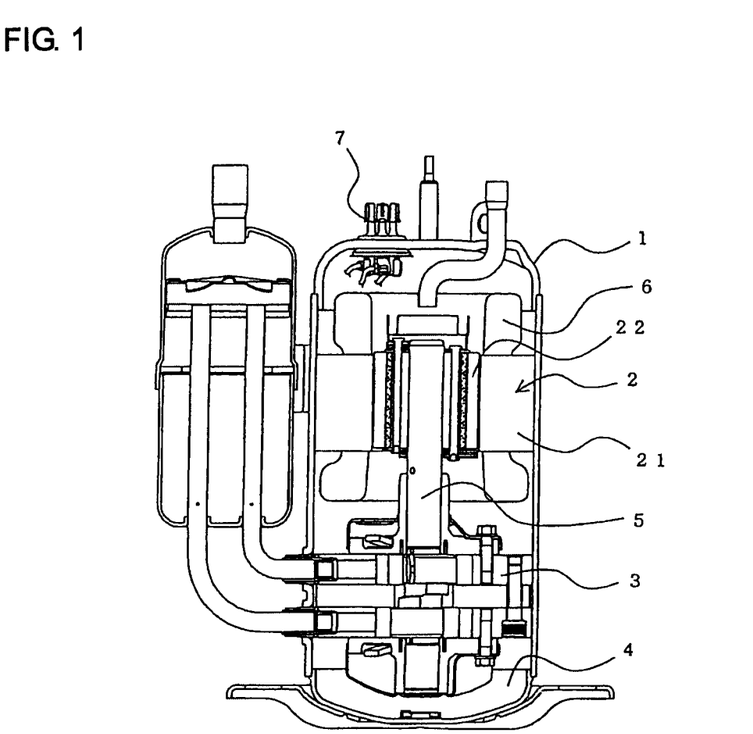
FIG. 1 is a schematic explanatory diagram (schematic diagram of a longitudinal section) illustrating an embodiment of an electric compressor mounted on a refrigeration and air-conditioning apparatus.
Figure 2:
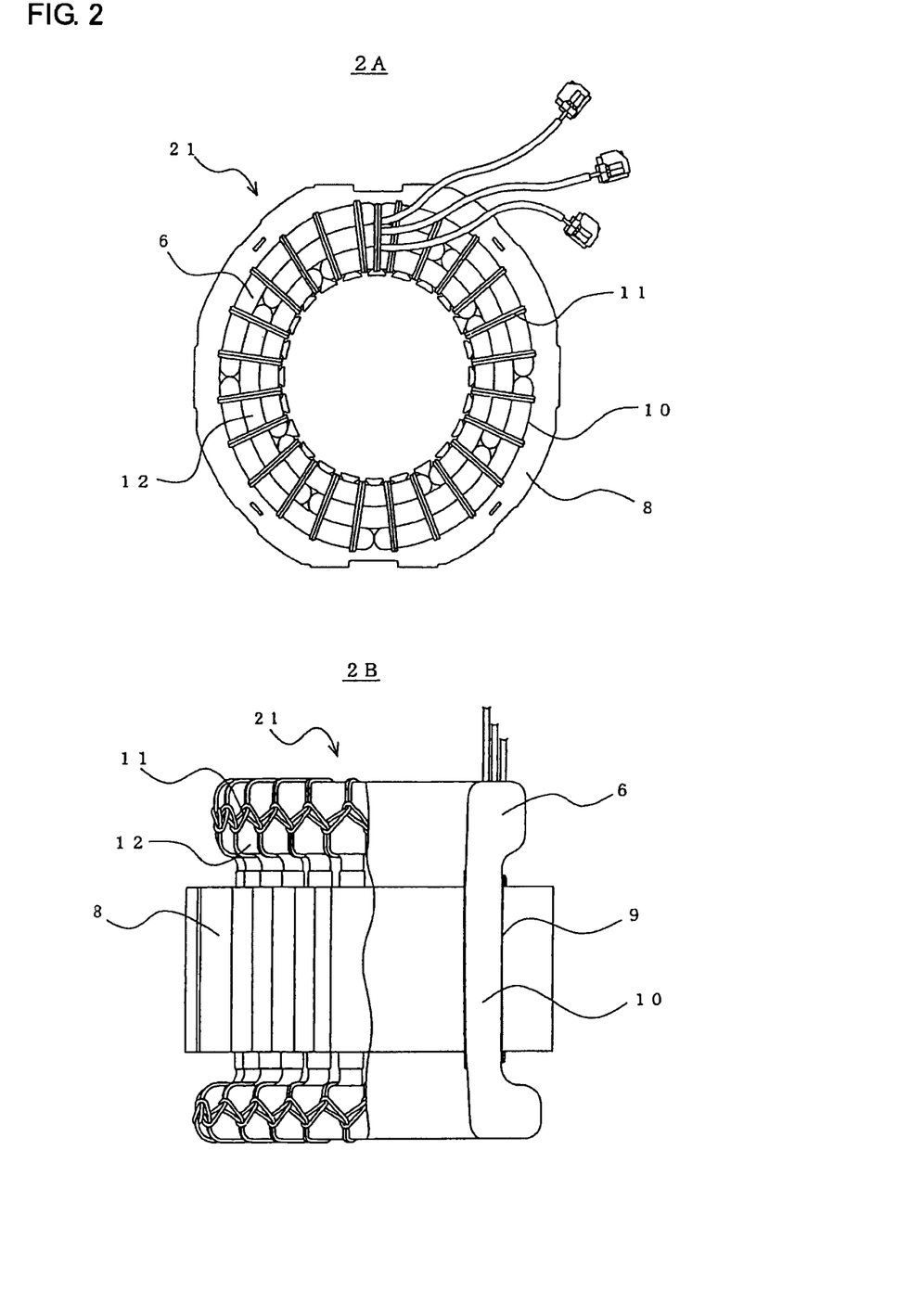

There are electric compressors mounted on refrigeration and air-conditioning apparatuses, such as refrigerators and air conditioners, with structures illustrated in FIGS. 1 and 2. FIG. 1 is a schematic explanatory diagram (schematic diagram of a longitudinal section) illustrating an embodiment of an electric compressor mounted on a refrigeration and air-conditioning apparatus. FIG. 2 is a partial schematic explanatory diagram illustrating a stator of a motor component in FIG. 1, in which FIG. 1A is a plan view and FIG. 1B is a side view partially showing a cross sectional view. Note that in FIGS. 1 and 2, a hermetic electric compressor is shown as an embodiment of an electric compressor mounted on a refrigeration and air-conditioning apparatus.

A motor component 2, a compression component 3 that is driven by the motor component 2, and other components are provided in a hermetic vessel 1. Further, refrigerating machine oil 4 is retained in the bottom portion of the hermetic vessel 1.

The motor component 2 includes a stator 21 and a rotor 22. An outer circumference of the stator 21 is fixed to the hermetic vessel 1. A magnet wire 6 provided in the stator 21 is connected to a sealed power terminal 7 provided in the hermetic vessel 1, and is supplied with power from a power source (not shown). The rotor 22 is supported so as to maintain a constant gap with an inner circumference of the stator 21, and is connected to the compression component 3 with the crankshaft 5.

As illustrated in FIG. 2, the stator 21 includes a core 8, the magnet wire 6, an insulating film 10, and a binding thread 11. The core 8 is a cylindrical laminate of iron plates. The magnet wire 6 is arranged so as to pass through a plurality of slots 9 that are formed in the axis direction in the core 8. Further, the magnet wire 6 is bound together with the binding thread 11. Furthermore, impregnation is applied to the magnet wire 6 with impregnating varnish 12 in order to improve its insulation performance.

The insulating film 10 is provided between the core 8 and the magnet wire 6, and between the layers of the magnet wire 6.

Conventional impregnating varnishes used in the impregnation of the magnet wire 6 include solventless varnish, such as polyester resins that include an aromatic olefin compound, represented by styrene, as a reactive diluent; epoxy resin based solvent varnish; and epoxy resin based solventless varnish. When impregnation is applied to the magnet wire 6 with such solventless varnish or solvent varnish, a large amount of solvent or volatile components of the reactive diluent volatilize during thermal curing. Accordingly, from the viewpoint of reducing environmental load, the amount of volatile components and the like volatilizing during thermal curing needs to be reduced.

Incidentally, refrigeration and air-conditioning apparatuses conventionally use chlorofluorocarbon refrigerants such as dichlorodifluoromethane (R-12) and hydrochlorofluorocarbon refrigerants such as monochlorodifluoromethane (R-22) (hereinafter, these refrigerants are referred to as "conventional refrigerants"). When conventional refrigerants are used in refrigeration and air-conditioning apparatuses, mineral oil based or alkylbenzenic based refrigerating machine oil or the like (hereinafter, referred to as "conventional refrigerating machine oil") with low polarity are typically used.

Furthermore, from the viewpoint of preventing depletion of the ozone layer, hydrofluorocarbon refrigerants such as 1,1,1,2-tetrafluoroethane (R-134a) that does not contain any chlorine atom in its molecules (hereinafter, may also be referred to as "alternative refrigerant") are used in refrigeration and air-conditioning apparatuses. Hydrofluorocarbon refrigerants are refrigerants with zero ozone depleting potential. When the alternative refrigerant is used in a refrigeration and air-conditioning apparatus, refrigerating machine oil based on polyalkylene glycol, ester, or ether (hereinafter, referred to as "alternative refrigerating machine oil") that have high polarity and high compatibility with the alternative refrigerant is used.

Additionally, in recent years, from the viewpoint of preventing global warming, refrigerants are being replaced to natural refrigerants such as $CO_2$, propane, or the like, since hydrofluorocarbon refrigerants has a large GWP (Global Warming Potential), which is the magnitude of influence on the global temperature rise. Alternative refrigerating machine oil with high polarity is also employed when a natural refrigerant is used in a refrigeration and air-conditioning apparatus.

That is, the cured varnish (impregnating varnish after thermal curing) in the hermetic vessel 1 is in an environment with a high-temperature high-pressure refrigerant system, the refrigerant system such as a conventional refrigerant/refrigerating machine oil, alternative refrigerant/refrigerating machine oil, or natural refrigerant/refrigerating machine oil. In addition, since refrigerant systems such as alternative refrigerant/alternative refrigerating machine oil and natural refrigerant/alternative refrigerating machine oil have higher polarity compared to that of the conventional refrigerant/refrigerating machine oil, when an alternative refrigerant or a natural refrigerant is used in a refrigeration and air-conditioning apparatus, degradation of the cured varnish and dissolving from the cured varnish into the refrigerant system occur. In particular, the extractability from the cured varnish is high when $CO_2$ is used as the refrigerant.

At this time, when the impregnating varnish includes components with low polarity, the compatibility between the extract that is extracted (dissolved) from the cured varnish and the refrigerating machine oil is low. Thus, substances with low molecular weight or the like is educed and is accumulated as sludge in an expansion unit, such as a capillary tube and an expansion valve, in the refrigeration and air-conditioning cycle, resulting in clogging of the expansion unit after operating for a long period of time. Accordingly, the impregnating varnish needs to have excellent resistance to the refrigerant system, such as little deterioration suppressing deterioration of mechanical strength, low extractability to the refrigerant system, and the like.

To overcome the above problems, a known impregnating varnish has been presented. For example, "an aqueous epoxy resin emulsion containing the following dissolved and/or dispersed in water: A) at least one binder selected from a group consisting of epoxy resins and modified epoxy resins; B) at least one polyurethane-based associative thickener; and C) at least one catalyst for curing that can be produced by allowing at least one boron trifluoride complex to react with at least one compound having at least one epoxy group" (see, Patent Literature 1, for example). The known impregnating varnish disclosed in Patent Literature 1, for example, aims to reduce volatile components and the like that volatiles during thermal curing.

CITATION LIST

Patent Literature

Patent Literature 1: Japanese Patent Publication No. 3904516 (claim 1)

SUMMARY OF INVENTION

Technical Problem

However, the extraction characteristics of the cured varnish of the impregnating varnish described in Patent Literature 1 is not mentioned when in the refrigerant system such as the alternative refrigerant/refrigerating machine oil or the natural refrigerant/refrigerating machine oil. Further, in the alternative refrigerant/refrigerating machine oil refrigerant system or the natural refrigerant/refrigerating machine oil refrigerant system, the compatibility of the extract extracted from the cured varnish and the refrigerant system is not mentioned.

That is, disadvantageously, there is no known impregnating varnish that has solved the two problems in the alternative refrigerant/refrigerating machine oil refrigerant system or the natural refrigerant/refrigerating machine oil refrigerant system; the two problems being reducing the volatile components and the like during thermal curing and resistance of the cured varnish to the refrigerant system.

The present invention has been made to solve the above-mentioned problems, and an object is to obtain water-dispersible varnish, in the alternative refrigerant/refrigerating machine oil refrigerant system or the natural refrigerant/refrigerating machine oil refrigerant system, that is capable of solving both problems, namely, reducing the volatile components and the like during thermal curing and resistance of the cured varnish to the refrigerant system. And a further object is to obtain water-dispersible varnish, an electric compressor using the water-dispersible varnish and a method of manufacturing the electric compressor, and a refrigeration and air-conditioning apparatus equipped with the electric compressor.

Solution to Problem

The water-dispersible varnish according to the present invention that is used in an electric compressor mounted on a refrigeration and air-conditioning apparatus, which uses a refrigerant having hydrofluorocarbon as a main component or a refrigerant having natural refrigerant as a main component, and that insulates and fixes a stator of the electric compressor, the water-dispersible varnish being a mixture including at least one epoxy acrylate resin having two or more (meth) acryloyl groups in one molecule as a thermosetting resin, the epoxy acrylate resin expressed by either one of the following General Formulas (I) to (III); at least one among a vinyl monomer having an ether bond, a vinyl monomer having an ester bond, a 1-alkylvinyl monomer having an ether bond, and a 1-alkylvinyl monomer having an ester bond as a reactive diluent; an organic peroxide as a reaction initiator; and water, in which

General Formula (I) is as follows.

[Chem. 1]

{where $R^1$, $R^2$, and $R^3$ each individually represent H or $CH_3$, and $R^4$ represents a group expressed by the following general formula:

[Chem. 2]

(where $R^5$ represents H or $CH_3$), n represents an integer of 1 to 6};

General Formula (II) is as follows:

[Chem. 3]

{where $R^6$, $R^7$, and $R^8$ each individually represent H or $CH_3$, and $R^9$ represents a group expressed by the following general formula:

[Chem. 4]

(where $R^5$ represents the same as mentioned above), m represents an integer from 1 to 6};

General Formula (III) is as follows:

[Chem. 5]

{where $R^{10}$, $R^{11}$, and $R^{12}$ each individually represent H or $CH_3$, and $R^{13}$, $R^{14}$, and $R^{15}$ represents a group expressed by the following general formula:

(where R⁵ represents the same as mentioned above), p represents an integer from 1 to 6}.

Further, a method, according to the present invention, of manufacturing an electric compressor mounted on a refrigeration and air-conditioning apparatus, which uses a refrigerant having hydrofluorocarbon as a main component or a refrigerant having natural refrigerant as a main component, is a method of manufacturing an electric compressor including a hermetic vessel housing a motor component and a compression component that is driven by the motor component, the hermetic vessel retaining in a bottom portion a refrigerating machine oil. The method includes a step of insulating and fixing a magnet wire of a stator of the motor component using the water-dispersible varnish of any one of claims 1 to 8 as impregnating varnish, and a step of heating and curing the water-dispersible varnish at 130 to 180 degrees C. for 0.5 to 5 hours.

Furthermore, an electric compressor according to the invention is mounted on a refrigeration and air-conditioning apparatus, which uses a refrigerant having hydrofluorocarbon as a main component of a refrigerant having natural refrigerant as a main component, in which the electric compressor includes a hermetic vessel housing a motor component and a compression component that is driven by the motor component, the hermetic vessel retaining in a bottom portion a refrigerating machine oil, wherein the electric compressor uses the above-mentioned water-dispersible varnish as impregnating varnish insulating and fixing a magnet wire of a stator of the motor component.

Additionally, a refrigeration and air-conditioning apparatus according to the invention is a refrigeration and air-conditioning apparatus that uses a refrigerant having hydrofluorocarbon as a main component or a refrigerant having natural refrigerant as a main component, and is equipped with the above-mentioned electric compressor.

Advantageous Effects of Invention

Since the impregnating varnish according to the invention is water-dispersible varnish, volatile components or the like during thermal curing can be reduced in the alternative refrigerant/refrigerating machine oil refrigerant system or the natural refrigerant/refrigerating machine oil refrigerant system. Further, since the impregnating varnish according to the invention is water-dispersible varnish that is a mixture of a specific thermosetting resin as a base polymer, a specific vinyl monomer as reactive diluent, organic peroxide as reaction initiator, and water, cured varnish exhibiting excellent resistance (little deterioration suppressing deterioration of mechanical strength, low extractability to the refrigerant system, and the like.) to the alternative refrigerant/refrigerating machine oil refrigerant system or the natural refrigerant/refrigerating machine oil refrigerant system can be obtained.

BRIEF DESCRIPTION OF DRAWINGS

FIG. 2 is a partial schematic explanatory diagram illustrating a stator of a motor component in FIG. 1, in which FIG. 2A is a plan view and FIG. 2B is a side view partially showing a cross sectional view.

DESCRIPTION OF EMBODIMENTS

Embodiments

Water-dispersible varnish according to the embodiment uses a monomer, as its reactive diluent, that has excellent compatibility with alternative refrigerating machine oil based on polyalkylene glycol, ester, or ether. Further, this water-dispersible varnish is water-dispersible varnish having small energy loss during its hardening process and is one capable of reducing environmental load. One of the significant features of the embodiment is the use of the above-mentioned water-dispersible varnish for the impregnating varnish.

Further, it is possible to improve the surface drying property by adding an organic acid metal salt to this water-dispersible varnish. The amount of extract from the cured varnish can be suppressed even in cases in which conventional refrigerating machine oil (hydrocarbon-based refrigerating machine oil) such as naphthenic or paraffinic mineral oil, alkylbenzene oil, or the like is used. This is another significant feature of the embodiment.

The water-dispersible varnish according to the embodiment is varnish obtained by mixing (A) a thermosetting resin that is a epoxy acrylate resin having two or more (meth) acryloyl groups in one molecule (hereinafter, also referred to as "base polymer");

(B) as a reactive diluent having excellent compatibility with refrigerating machine oil based on polyalkylene glycol, ester, or ether, a vinyl monomer having an ether bond, a vinyl monomer having an ester bond, a 1-alkylvinyl monomer having an ether bond, or a 1-alkylvinyl monomer having an ester bond (hereinafter, these vinyl monomers and 1-alkylvinyl monomers are also collectively referred to as "vinyl monomer for reactive diluent");

(C) an organic peroxide as a reaction initiator; and (D) water.

As required, (E) a polyfunctional vinyl monomer having three or more (meth) acryloyl groups or an allyl group in one molecule, (F) an organic peroxide as a reaction initiator; and

(G) a water-soluble organic compound as a surfactant may be mixed into the above-described water-dispersible varnish.

Furthermore, as required, an organic acid metal salt, a photoinitiator, and the like may be mixed.

The base polymer is a thermosetting resin having two or more (meth) acryloyl groups in one molecule and is an epoxy acrylate resin (vinyl ester resin). This epoxy acrylate resin has low extractability in the alternative refrigerant/refrigerating machine oil refrigerant system and has excellent hydrolysis resistance.

As such epoxy acrylate resin, for example, there are compounds expressed by the following general formula (I).

[Chem. 7]

(I)

{where $R^1$, $R^2$, and $R^3$ each individually represent H or $CH_3$, and $R^4$ represents a group expressed by the following general formula:

[Chem. 8]

(where $R^5$ represents H or $CH_3$), n represents an integer from 1 to 6}

Further, as such epoxy acrylate resin, for example, there are compounds expressed by the following general formula (II).

[Chem. 9]

(II)

{where $R^6$, $R^1$, and $R^8$ each individually represent H or $CH_3$, and $R^9$ represents a group expressed by the following general formula:

[Chem. 10]

(where $R^5$ represents the same as mentioned above), m represents an integer from 1 to 6}

Furthermore, as such epoxy acrylate resin, for example, there are compounds expressed by the following general formula (III).

[Chem. 11]

(III)

{where $R^{10}$, $R^{11}$, and $R^{12}$ each individually represent H or $CH_3$, and $R^{13}$, $R^{14}$, and $R^{15}$ represents a group expressed by the following general formula:

[Chem. 12]

(where $R^5$ represents the same as mentioned above), p represents an integer from 1 to 6}

These epoxy acrylate resins may be used alone or as a mixture of two or more of the kind.

The reactive diluent is a vinyl monomer that has excellent compatibility with the alternative refrigerating machine oil such as polyalkylene glycol oil, ester oil, ether oil, and the like. It is preferable for the vinyl monomer for the reactive diluent to be a vinyl monomer having an intramolecular ether bond, a vinyl monomer having an intramolecular ester bond, a 1-alkylvinyl monomer having an intramolecular ether bond, or a 1-alkylvinyl monomer having an intramolecular ester bond. As such vinyl monomer, for example, there are compounds such as 2-hydroxyethyl (meth) acrylate, 2-hydroxypropyl (meth) acrylate, lauryl (meth) acrylate, and ethoxydiethylene glycol (meth) acrylate expressed by the following general formula (IV)

[Chem. 13]

(IV)

{where $R^{16}$ represents a hydrogen atom or an alkyl group having one to five carbon atoms, $R^{17}$ represents —$(CH_2)_q$— (q is an integer of 1 to 6) or —$(CH(R^{18})O)_r$— ($R^{18}$ is a hydrogen atom or an alkyl group having one to five carbon atoms, r is an integer of 1 to 6), and X represents H, OH, or $OCO(R^{19})$ ($R^{19}$ is an alkyl group having one to five carbon atoms, a vinyl group, or a 1-alkylvinyl group including an alkyl group having one to five carbon atoms)}

Further, as such vinyl monomer, for example, there are compounds such as diethyleneglycol-bis-allylcarbonate expressed by the following general formula (V).

[Chem. 14]

(where $R^{20}$ represents a hydrogen atom or a group expressed by the following formula.)

[Chem. 15]

These vinyl monomers may be used alone or as a mixture of two or more of the kind. Among the above, from the viewpoint of the excellent compatibility with alternative refrigerating machine oils in particular, 2-hydroxyethyl (meth) acrylate and hydroxypropyl (meth) acrylate are preferred.

Among the characteristics of the cured varnish, when the extractability to the refrigerant system is taken into consideration, the ratio of the thermosetting resin to the vinyl monomer for the reactive diluent (thermosetting resin:vinyl monomer for reactive diluent (weight ratio)) is desirably 10:90 or more, and more preferably 30:70 or more. Further, in order to eliminate the risk of the viscosity of the varnish becoming excessively high hindering the impregnating ability to the electric compressor coil, the ratio of the thermosetting resin to the vinyl monomer for the reactive diluent (thermosetting resin:vinyl monomer for reactive diluent (weight ratio)) is desirably 90:10 or less, and more preferably 70:30 or less.

Furthermore, in the embodiment, with an objective of increasing the crosslink density of the cured varnish and further reducing the amount of extraction in the refrigerant/refrigerating machine oil refrigerant system, a polyfunctional vinyl monomer having three or more, preferably three to 6 (meth) acryloyl groups or allyl groups in one molecule may be used as a reactive diluent, as necessary. As such polyfunctional vinyl monomer, for example, there are esters or ethers that can be obtained by reaction between (A) carboxylic acid, such as trimellitic acid and pyromellitic acid, or alcohol, such as trimethylolpropane, trihydroxyethylisocyanurate, and pentaerythritol, (B) vinyl group-containing monomer, such as acrylic acid, methacrylic acid, and allyl alcohol. More preferably, as such polyfunctional vinyl monomer, trimethylolpropanetrimethacrylate, tris(2-hydroxyethyl)isocyanurate triacrylate, and dipentaerythritol hexaacrylate can be cited, by way of example.

The polyfunctional vinyl monomer may be partially replaced with the vinyl monomer for the reactive diluent that has excellent compatibility with the refrigerating machine oil such as polyalkylene glycol oil, ester oil, ether oil and the like. In order to increase the effect of reducing the amount of extraction in the refrigerant/refrigerating machine oil refrigerant system, the amount of the polyfunctional vinyl monomer is desirably 3 wt % or higher of the vinyl monomer for the reactive diluent, and more preferably, 20 wt % or higher thereof. Furthermore, in order to eliminate the risk of the crosslink density becoming excessively high and crack occurring due to the hardening shrinkage of the cured varnish, the amount of the polyfunctional vinyl monomer is desirably 60 wt % or lower of the vinyl monomer for the reactive diluent, and more preferably, 50 wt % or lower thereof.

The organic peroxide, which is a reaction initiator used in the embodiment, is not limited to a specific organic peroxide. As the organic peroxide used as a reaction initiator, perhexyl such as t-hexyl hydroperoxide, acyl peroxide such as benzoyl peroxide, peracid ester such as t-butyl peroxybenzoate, organic hydroperoxide such as tetramethylbutyl hydroperoxide, and dialkyl peroxide such as dicumyl peroxide may be preferably cited, by way of example.

In order to eliminate the risk of the hardenability of the water-dispersible varnish from significantly decreasing, the amount of the organic peroxide is, relative to 100 parts by weight of the entire amount of the water-dispersible varnish, desirably 0.05 part by weight or higher, and more preferably, 0.3 part by weight or higher. Further, in order to eliminate the pot life characteristics of the water-dispersible varnish from becoming significantly short, the amount of the organic peroxide is, relative to 100 parts by weight of the entire amount of the water-dispersible varnish, desirably 5 parts by weight or lower, and more preferably, 3 parts by weight or lower.

Furthermore, in the embodiment, with the objective of suppressing the amount of extraction to conventional refrigerating machine oils (hydrocarbon-based refrigerating machine oil) such as naphthenic or paraffinic mineral oil, alkylbenzene oil, or the like, organic acid metal salt may be mixed into the water-dispersible varnish. By using organic acid metal salt in combination with the base polymer, the surface hardenability of the water-dispersible varnish will be improved significantly, and, thus, it will be possible to reduce the amount of extraction.

As such organic acid metal salt, salt composed of organic acid such as octylic acid, naphthenic acid, or the like, and metal such as Co, Mn, Sn, Ni, Zn, Pb, Cr, Fe, or the like may be cited, by way of example. Furthermore, as such organic acid metal salt, cobalt naphthenate, manganese naphthenate, tin naphthenate, nickel naphthenate, zinc naphthenate, lead naphthenate, chromium naphthenate, iron naphthenate, and the like may be preferably cited, by way of example.

In order to further increase the hardenability of the water-dispersible varnish, the amount of the organic acid metal salt is, relative to 100 parts by weight of the entire amount of the water-dispersible varnish, desirably 0.015 part by weight or higher, and more preferably, 0.03 part by weight or higher. Further, in order to eliminate the pot life characteristics of the water-dispersible varnish from deteriorating, the amount of the organic acid metal salt is, relative to 100 parts by weight of the entire amount of the water-dispersible varnish, desirably 3 parts by weight or lower, and more preferably, 1.5 parts by weight or lower.

Furthermore, in the embodiment, regarding the hardening after the removal of water, with the objective of allowing ultraviolet curing of the water-dispersible varnish to be performed, a photoinitiator may be mixed into the water-dispersible varnish as a reaction initiator. By enabling ultraviolet curing to be performed, the evaporation of monomers during thermal curing can be suppressed, and, further, the deterioration of the work environment and impact on air pollution can be significantly reduced.

The photoinitiator used in the embodiment, is not limited to a specific photoinitiator. As a photoinitiator, benzoin ether compounds such as benzoin isobutyl ether, hydroxycyclohexyl phenyl ketone, or the like, benzyl ketal compounds such as benzil dimethylketal or the like, acetophenone derivatives such as 2-Hydroxy-2-methylpropiophenone, and ketone compounds such as 4,4'-bis(dimethylamino)benzophenone may be preferably cited, by way of example.

In order for the ultraviolet curability of the water-dispersible varnish to be sufficiently expressed, the amount of the photoinitiator is, relative to 100 parts by weight of the entire amount of the water-dispersible varnish, desirably 0.2 part by weight or higher, and more preferably, 0.5 part by weight or higher. Further, in order to eliminate the risk of large amount of photoinitiator from the cured varnish to extract into the refrigerant becoming a contamination source of the refrigerant system, the amount of the photoinitiator is, relative to 100 parts by weight of the entire amount of the water-dispersible varnish, desirably 15 parts by weight or lower, and more preferably, 10 parts by weight or lower.

Furthermore, with the objective of increasing the compatibility between the organic compounds and water and increasing the storage stability of the water-dispersible varnish, a surfactant may be mixed into the water-dispersible varnish. The use of a surfactant will enable the coating weight to the magnet wire to be uniform.

The surfactant used in the embodiment is a water-soluble surfactant, but the surfactant is not limited in particular. For example, as a surfactant, nonionic surfactant such as polyoxyethylene alkyl ether, polyoxyalkylene derivative, sorbitan fatty acid ester, polyoxyethylene sorbitan fatty acid ester, polyoxyethylene sorbitol fatty acid ester, glycerine fatty acid ester, polyoxyethylene fatty acid ester, polyoxyethylene hydrogenated castor oil, polyoxyethylene alkylamine, alkyl alkanolamide; and anionic surfactants such as sodium lauryl sulfate, higher alcohol sodium sulfate, alkyl sulfate ester salt, polyoxyethylene alkyl ether sulfate ester salt, alkyl benzene sulfonate salt, sodium alkyl naphthalene sulfonate, sodium dialkyl sulfosuccinate, sodium alkyl diphenyl ether disulfonate, sodium alkanesulfonate, ammonium polyoxyalkylene alkenyl ether sulfate, fatty acid salt, dipotassium alkenyl succinate, sodium salts of β-naphthalene sulfonic acid-formaldehyde condensates, sodium salts of formalin-condensed aromatic sulfonic acid, and polycarboxylic-acid-type polymer surfactant may be used, for example. Further, as a surfactant, cationic surfactant such as alkyl amine salt and quaternary ammonium salt may be used, for example. Furthermore, as a surfactant, amphoteric surfactant may be used, for example.

These surfactants may be used alone or as a mixture of two or more of the kind. Among the above, from the viewpoint of the excellent compatibility with the base polymer in particular, (poly)oxyalkylene alkenyl ether is preferred. This surfactant has low extractability in the refrigerant/refrigerating machine oil and has excellent hydrolysis resistance.

In order for the water dispersible property of the base polymer to be sufficiently expressed, the amount of the surfactant used in the embodiment is, relative to 100 parts by weight of the amount of the base polymer, desirably 0.5 part by weight or higher, and more preferably, 3 parts by weight or higher. Further, in order to eliminate the risk of becoming a cause of decrease in the heat resistance of the cured varnish, the surfactant used in the embodiment is desirably 20 parts by weight or lower, and more preferably, 15 parts by weight or lower.

The water-dispersible varnish of the embodiment is obtained by mixing, for example, the above-mentioned organic compounds such as the thermosetting resin, the reactive diluent, the catalyst, the organic acid metal salt, the photoinitiator, the surfactant, and the like with water. The ratio of the organic compounds to water (organic compounds: water (weight ratio)) is desirably 15:85 or more, and more preferably, 30:70 or more. Further, in order to eliminate the risk of the viscosity of the varnish becoming excessively high hindering the impregnating ability to the electric compressor coil, the ratio of the organic compounds to water (organic compounds:water (weight ratio)) is desirably 90:10 or less, and more preferably 70:30 or less.

Note that the method of producing the water-dispersible varnish is not limited in particular, and each amount of the thermosetting resin, vinyl monomer and organic peroxide for the reactive diluent, surfactant, and water, and, as necessary, polyfunctional vinyl monomer, organic acid metal salt, photoinitiator may be appropriately adjusted and mixed.

Subsequently, a method of manufacturing a hermetic electric compressor according to the embodiment will be described. In the embodiment, the hermetic electric compressor illustrated in FIGS. 1 and 2 is manufactured.

One of the significant features of the method of manufacturing the hermetic electric compressor according to the embodiment is the use of the above water-dispersible varnish as an impregnating varnish to insulate and fix a magnet wire 6 of a stator 21 of a motor component 2.

After impregnating the magnet wire 6 of the stator 21 of the motor component 2 with the water-dispersible varnish, the water-dispersible varnish is heated at a specific temperature for a specific period of time and is cured. Such stator is incorporated to obtain the hermetic electric compressor.

The curing conditions while curing the water-dispersible varnish are as follows: heating temperature is 130 degrees C. or higher (preferably 140 degrees C. or higher) and 180 degrees C. or lower (preferably 175 degrees C. or lower); and the heating period of time is 0.5 hours or more (preferably 1 hour or more) and 5 hours or less (preferably 4 hours or less). By adopting the above curing conditions, an electrically and mechanically excellent coil for an electric compressor can be obtained.

Note that if the heating temperature and the heating period of time are under the lower limit values, there will be an uncured portion in the water-dispersible varnish during the curing process, and various electrical and mechanical characteristics will drop. Further, if the heating temperature and the heating period of time exceed the upper limit values, the crosslinking reaction during the curing process will be unbalanced and will be the cause of crack in the insulated product (cured varnish).

EXAMPLES

Subsequently, with the examples below, the water-dispersible varnish according to the embodiment will be further described in detail. Note that the water-dispersible varnish according to the embodiment is not limited to the below examples.

Example 1

Impregnating varnish (water-dispersible varnish) was obtained by mixing 25 parts by weight of epoxy acrylate (bisphenol A type, two acryloyl groups in one molecule, number average molecular weight of approximately 500) as base polymer; 12 parts by weight of 2-hydroxypropyl methacrylate and 10 parts by weight of 2-hydroxypropyl acrylate as reactive diluent; 0.5 part by weight of t-butyl peroxybenzoate as organic peroxide; 0.05 part by weight of cobalt naphthenate as organic acid metal salt; 3 parts by weight of surfactant; and 50 parts by weight of water.

A sheet was fabricated by enclosing the obtained impregnating varnish between glass plates with a gap of 0.2 mm therebetween, thermal curing at 160 degrees C. for 3 hours, and removing from the glass plates.

In order to evaluate the extraction characteristics of the sheet in the refrigerant/refrigerating machine oil refrigerant system, an extraction characteristics test in methanol was conducted using methanol, in which the cured varnish shows higher extractability than in the refrigerant. A Soxhlet extraction apparatus was used in the extraction characteristics test in which the sheet was heated at a temperature below the boiling point of the methanol for 8 hours. Then, the methanol was evaporated to dryness, the weight of the flask of the extraction apparatus was measured, and the extractability was calculated from the weight difference between the flask of the extraction apparatus before the test and after the test. The extractability of the sheet was calculated according to the below formula.

Extractability (%)=(weight of the flask of the extraction apparatus after evaporation of methanol−weight of the flask of the extraction apparatus before the test)/the weight of the sheet before the test×100.

Additionally, a similar test was conducted to impregnating varnish that had been stored for one month under a temperature condition of 40 degrees C.

The results are shown in Table 1.

Further, after the magnet wire 6, which is provided in the stator 21 of the hermetic electric compressor, was impregnated with the impregnating varnish and then was thermal cured at 160 degrees C. for 3 hours, a real machine (the hermetic electric compressor shown in FIGS. 1 and 2) was fabricated by incorporating the stator 21 into the hermetic electric compressor.

In order to ascertain whether there has been any appearance change of the coil and any formation of sludge in the refrigerant/refrigerating machine oil refrigerant system of the real machine, the real machine was incorporated in a simulated refrigeration cycle for evaluation. Furthermore, an accelerated reliability test of 2000 hours was run after charging 4 kg of R-407C (manufactured by Daikin Industries, Ltd.; a ternary refrigerant mixture of R-134a/R-125/R-32), which is hydrofluorocarbon, as refrigerant and 1.6 kg of compatible type ester oil (manufactured by Nippon Oil Co., Ltd.; Freol Alpha) as refrigerating machine oil in the simulated refrigeration cycle.

After the 2000-hour accelerated reliability test was run, a flow reduction rate of a throttled portion of an expansion valve of the simulated refrigeration cycle was measured. The flow reduction rate of the throttled portion of the expansion valve was calculated by sending refrigerant or air with a constant pressure ($0.49N/m^2$) into the piping and measuring the flow rate at the outlet, and by obtaining the ratio between the flow rate at the outlet before the 2000-hour operation and that after the operation. The formula for calculating the flow reduction rate of the throttled portion of the expansion valve is as follows.

Flow reduction rate (%)=(outlet flow rate after the 2000-hour operation/outlet flow rate before the 2000-hour operation)×100.

Note that higher the value of the flow reduction rate, smaller the flow reduction at the throttled portion will be.

Further, the appearance change of the expansion valve and the pipeline was visually checked after the 2000-hour accelerated reliability test was run. An inspection was carried out based on the evaluation criteria below. Note that the check on the appearance change of the expansion valve and the pipeline was carried out by disassembling the simulated refrigeration cycle and the real machine and visually checking the inner surfaces and the like of the expansion valve and the pipeline.

(Evaluation Criteria of Appearance Change)

○: no change at all, Δ: minor change, x: major change

The results are shown in Table 2.

Example 2

Using impregnating varnish obtained in the same manner as Example 1, a sheet was fabricated by thermal curing at 170 degrees C. for 2 hours. Other fabricating conditions of the sheet are the same as those of Example 1.

In order to evaluate the extraction characteristics of the sheet in the refrigerant/refrigerating machine oil refrigerant system, an extraction characteristics test against the refrigerant system was conducted using, same as Example 1, methanol.

Additionally, a similar test was conducted to impregnating varnish that had been stored for one month under a temperature condition of 40 degrees C.

The results are shown in Table 1.

Further, after the magnet wire 6, which is provided in the stator 21 of the hermetic electric compressor, was impregnated with the impregnating varnish that was obtained in the same manner as Example 1 and then was thermal cured at 170 degrees C. for 2 hours, a real machine (the hermetic electric compressor shown in FIGS. 1 and 2) was fabricated by incorporating the stator 21 into the hermetic electric compressor.

In order to ascertain whether there has been any appearance change of the coil and any formation of sludge in the refrigerant/refrigerating machine oil refrigerant system of the real machine, the real machine was incorporated in a simulated refrigeration cycle for evaluation. Furthermore, an accelerated reliability test of 2000 hours was run after charging 4 kg of R-744 ($CO_2$) as refrigerant and 1.6 kg of polyalkylene glycol as refrigerating machine oil in the simulated refrigeration cycle.

After the 2000-hour accelerated reliability test was run, a flow reduction rate of a throttled portion of an expansion valve was measured and the appearance change of the expansion valve and the pipeline was visually checked, as in the same manner as Example 1. The results are shown in Table 2.

Example 3

Using impregnating varnish obtained in the same manner as Example 1, a sheet was fabricated by thermal curing at 130 degrees C. for 5 hours. Other fabricating conditions of the sheet are the same as those of Example 1.

In order to evaluate the extraction characteristics of the sheet, in the refrigerant/refrigerating machine oil refrigerant system, an extraction characteristics test against the refrigerant system was conducted using, same as Example 1, methanol.

Additionally, a similar test was conducted to impregnating varnish that had been stored for one month under a temperature condition of 40 degrees C.

The results are shown in Table 1.

Further, after the magnet wire 6, which is provided in the stator 21 of the hermetic electric compressor, was impregnated with the impregnating varnish that was obtained in the same manner as Example 1 and then was thermal cured at 130 degrees C. for 5 hours, a real machine (the hermetic electric compressor shown in FIGS. 1 and 2) was fabricated by incorporating the stator 21 into the hermetic electric compressor.

In order to ascertain whether there has been any appearance change of the coil and any formation of sludge in the refrigerant/refrigerating machine oil refrigerant system of the real machine, the real machine was incorporated in a simulated refrigeration cycle for evaluation. Furthermore, an accelerated reliability test of 2000 hours was run after charging 4 kg of R-290 as refrigerant and 1.6 kg of polyvinyl ether as refrigerating machine oil in the simulated refrigeration cycle.

After the 2000-hour accelerated reliability test was run, a flow reduction rate of a throttled portion of an expansion valve was measured and the appearance change of the expansion valve and the pipeline was visually checked, as in the same manner as Example 1. The results are shown in Table 2.

Example 4

Using impregnating varnish obtained in the same manner as Example 1, a sheet was fabricated by thermal curing at 150 degrees C. for 5 hours. Other fabricating conditions of the sheet are the same as those of Example 1.

In order to evaluate the extraction characteristics of the sheet in the refrigerant/refrigerating machine oil refrigerant system, an extraction characteristics test against the refrigerant system was conducted using, same as Example 1, methanol.

Additionally, a similar test was conducted to impregnating varnish that had been stored for one month under a temperature condition of 40 degrees C.

The results are shown in Table 1.

Further, after the magnet wire 6, which is provided in the stator 21 of the hermetic electric compressor, was impregnated with the impregnating varnish that was obtained in the same manner as Example 1 and then was thermal cured at 150 degrees C. for 5 hours, a real machine (the hermetic electric compressor shown in FIGS. 1 and 2) was fabricated by incorporating the stator 21 into the hermetic electric compressor.

In order to ascertain whether there has been any appearance change of the coil and any formation of sludge in the refrigerant/refrigerating machine oil refrigerant system of the real machine, the real machine was incorporated in a simulated refrigeration cycle for evaluation. Furthermore, an accelerated reliability test of 2000 hours was run after charging 4 kg of R-1270 as refrigerant and 1.6 kg of polyalkylene glycol as refrigerating machine oil in the simulated refrigeration cycle.

After the 2000-hour accelerated reliability test was run, a flow reduction rate of a throttled portion of an expansion valve was measured and the appearance change of the expansion valve and the pipeline was visually checked, as in the same manner as Example 1. The results are shown in Table 2.

Example 5

Using impregnating varnish obtained in the same manner as Example 1, a sheet was fabricated by thermal curing at 180 degrees C. for 0.5 hours. Other fabricating conditions of the sheet are the same as those of Example 1.

In order to evaluate the extraction characteristics of the sheet in the refrigerant/refrigerating machine oil refrigerant system, an extraction characteristics test against the refrigerant system was conducted using, same as Example 1, methanol.

Additionally, a similar test was conducted to impregnating varnish that had been stored for one month under a temperature condition of 40 degrees C.

The results are shown in Table 1.

Further, after the magnet wire 6, which is provided in the stator 21 of the hermetic electric compressor, was impregnated with the impregnating varnish that was obtained in the same manner as Example 1 and then was thermal cured at 180 degrees C. for 0.5 hours, a real machine (the hermetic electric compressor shown in FIGS. 1 and 2) was fabricated by incorporating the stator 21 into the hermetic electric compressor.

In order to ascertain whether there has been any appearance change of the coil and any formation of sludge in the refrigerant/refrigerating machine oil refrigerant system of the real machine, the real machine was incorporated in a simulated refrigeration cycle for evaluation. Furthermore, an accelerated reliability test of 2000 hours was run after charging 4 kg of R-717 (ammonia) as refrigerant and 1.6 kg of polyvinyl ether as refrigerating machine oil in the simulated refrigeration cycle.

After the 2000-hour accelerated reliability test was run, a flow reduction rate of a throttled portion of an expansion valve was measured and the appearance change of the expansion valve and the pipeline was visually checked, as in the same manner as Example 1. The results are shown in Table 2.

Example 6

Impregnating varnish (water-dispersible varnish) was obtained by mixing 30 parts by weight of epoxy acrylate (novolac type, two acryloyl groups in one molecule, number average molecular weight of approximately 850) as base polymer; 27 parts by weight of 2-hydroxyethyl methacrylate and 10 parts by weight of trimethylolpropanetrimethacrylate as reactive diluent; 0.5 part by weight of t-butyl peroxybenzoate as organic peroxide; 0.05 part by weight of cobalt naphthenate as organic acid metal salt; 3 parts by weight of surfactant; and 40 parts by weight of water.

A sheet was fabricated using this impregnating varnish, as in the same manner as Example 1.

In order to evaluate the extraction characteristics of the sheet in the refrigerant/refrigerating machine oil refrigerant system, an extraction characteristics test against the refrigerant system was conducted using, same as Example 1, methanol.

Additionally, a similar test was conducted to impregnating varnish that had been stored for one month under a temperature condition of 40 degrees C.

The results are shown in Table 1.

Further, using the impregnating varnish that was obtained in Example 6, a real machine (the hermetic electric compressor shown in FIGS. 1 and 2) was fabricated by the same conditions as Example 1.

In order to ascertain whether there has been any appearance change of the coil and any formation of sludge in the refrigerant/refrigerating machine oil refrigerant system of the real machine, the real machine was incorporated in a simulated refrigeration cycle for evaluation. Furthermore, an accelerated reliability test of 2000 hours was run after charging 4 kg of R-407, which is the same R-407 used in Example 1, as refrigerant and 1.5 kg of paraffinic mineral oil (manufactured by Mitsubishi Oil Co., Ltd.; DIAMOND FREEZE) as refrigerating machine oil in the simulated refrigeration cycle.

After the 2000-hour accelerated reliability test was run, a flow reduction rate of a throttled portion of an expansion valve was measured and the appearance change of the expansion valve and the pipeline was visually checked, as in the same manner as Example 1. The results are shown in Table 2.

Example 7

Using impregnating varnish obtained in the same manner as Example 6, a sheet was fabricated by thermal curing at 145 degrees C. for 2 hours. Other fabricating conditions of the sheet are the same as those of Example 6.

In order to evaluate the extraction characteristics of the sheet in the refrigerant/refrigerating machine oil refrigerant system, an extraction characteristics test against the refrigerant system was conducted using, same as Example 1, methanol.

Additionally, a similar test was conducted to impregnating varnish that had been stored for one month under a temperature condition of 40 degrees C.

The results are shown in Table 1.

Further, after the magnet wire 6, which is provided in the stator 21 of the hermetic electric compressor, was impregnated with the impregnating varnish that was obtained in the same manner as Example 6 and then was thermal cured at 145 degrees C. for 2 hours, a real machine (the hermetic electric compressor shown in FIGS. 1 and 2) was fabricated by incorporating the stator 21 into the hermetic electric compressor.

In order to ascertain whether there has been any appearance change of the coil and any formation of sludge in the refrigerant/refrigerating machine oil refrigerant system of the real machine, the real machine was incorporated in a simulated refrigeration cycle for evaluation. Furthermore, an accelerated reliability test of 2000 hours was run after charging 4 kg of R-744 ($CO_2$) as refrigerant and 1.6 kg of polyvinyl ether as refrigerating machine oil in the simulated refrigeration cycle.

After the 2000-hour accelerated reliability test was run, a flow reduction rate of a throttled portion of an expansion valve was measured and the appearance change of the expansion valve and the pipeline was visually checked, as in the same manner as Example 1. The results are shown in Table 2.

Example 8

Using impregnating varnish obtained in the same manner as Example 6, a sheet was fabricated by thermal curing at 170 degrees C. for 3.5 hours. Other fabricating conditions of the sheet are the same as those of Example 6.

In order to evaluate the extraction characteristics of the sheet in the refrigerant/refrigerating machine oil refrigerant system, an extraction characteristics test against the refrigerant system was conducted using, same as Example 1, methanol.

Additionally, a similar test was conducted to impregnating varnish that had been stored for one month under a temperature condition of 40 degrees C.

The results are shown in Table 1.

Further, after the magnet wire 6, which is provided in the stator 21 of the hermetic electric compressor, was impregnated with the impregnating varnish that was obtained in the same manner as Example 6 and then was thermal cured at 170 degrees C. for 3.5 hours, a real machine (the hermetic electric compressor shown in FIGS. 1 and 2) was fabricated by incorporating the stator 21 into the hermetic electric compressor.

In order to ascertain whether there has been any appearance change of the coil and any formation of sludge in the refrigerant/refrigerating machine oil refrigerant system of the real machine, the real machine was incorporated in a simulated refrigeration cycle for evaluation. Furthermore, an accelerated reliability test of 2000 hours was run after charging 4 kg of R-290 as refrigerant and 1.6 kg of polyalkylene glycol as refrigerating machine oil in the simulated refrigeration cycle.

After the 2000-hour accelerated reliability test was run, a flow reduction rate of a throttled portion of an expansion valve was measured and the appearance change of the expansion valve and the pipeline was visually checked, as in the same manner as Example 1. The results are shown in Table 2.

Example 9

Using impregnating varnish obtained in the same manner as Example 6, a sheet was fabricated by thermal curing at 150 degrees C. for 3 hours. Other fabricating conditions of the sheet are the same as those of Example 6.

In order to evaluate the extraction characteristics of the sheet in the refrigerant/refrigerating machine oil refrigerant system, an extraction characteristics test against the refrigerant system was conducted using, same as Example 1, methanol.

Additionally, a similar test was conducted to impregnating varnish that had been stored for one month under a temperature condition of 40 degrees C.

The results are shown in Table 1.

Further, after the magnet wire 6, which is provided in the stator 21 of the hermetic electric compressor, was impregnated with the impregnating varnish that was obtained in the same manner as Example 6 and then was thermal cured at 150 degrees C. for 3 hours, a real machine (the hermetic electric compressor shown in FIGS. 1 and 2) was fabricated by incorporating the stator 21 into the hermetic electric compressor.

In order to ascertain whether there has been any appearance change of the coil and any formation of sludge in the refrigerant/refrigerating machine oil refrigerant system of the real machine, the real machine was incorporated in a simulated refrigeration cycle for evaluation. Furthermore, an accelerated reliability test of 2000 hours was run after charging 4 kg of R-1270 as refrigerant and 1.6 kg of polyvinyl ether as refrigerating machine oil in the simulated refrigeration cycle.

After the 2000-hour accelerated reliability test was run, a flow reduction rate of a throttled portion of an expansion valve was measured and the appearance change of the expansion valve and the pipeline was visually checked, as in the same manner as Example 1. The results are shown in Table 2.

Example 10

Using impregnating varnish obtained in the same manner as Example 6, a sheet was fabricated by thermal curing at 180 degrees C. for 2 hours. Other fabricating conditions of the sheet are the same as those of Example 6.

In order to evaluate the extraction characteristics of the sheet in the refrigerant/refrigerating machine oil refrigerant system, an extraction characteristics test against the refrigerant system was conducted using, same as Example 1, methanol.

Additionally, a similar test was conducted to impregnating varnish that had been stored for one month under a temperature condition of 40 degrees C.

The results are shown in Table 1.

Further, after the magnet wire 6, which is provided in the stator 21 of the hermetic electric compressor, was impregnated with the impregnating varnish that was obtained in the same manner as Example 6 and then was thermal cured at 180 degrees C. for 2 hours, a real machine (the hermetic electric compressor shown in FIGS. 1 and 2) was fabricated by incorporating the stator 21 into the hermetic electric compressor.

In order to ascertain whether there has been any appearance change of the coil and any formation of sludge in the refrigerant/refrigerating machine oil refrigerant system of the real machine, the real machine was incorporated in a simulated refrigeration cycle for evaluation. Furthermore, an accelerated reliability test of 2000 hours was run after charging 4 kg of R-717 (ammonia) as refrigerant and 1.6 kg of polyalkylene glycol as refrigerating machine oil in the simulated refrigeration cycle.

After the 2000-hour accelerated reliability test was run, a flow reduction rate of a throttled portion of an expansion valve was measured and the appearance change of the expansion valve and the pipeline was visually checked, as in the same manner as Example 1. The results are shown in Table 2.

Comparative Example 1

Impregnating varnish (water-dispersible varnish) was obtained by mixing 20 parts by weight of unsaturated polyester resin (number average molecular weight of approximately 3500) as base polymer; 30 parts by weight of styrene as reactive diluent; 0.03 part by weight of t-butyl peroxybenzoate as organic peroxide; 0.05 part by weight of cobalt naphthenate as organic acid metal salt; 3 parts by weight of surfactant; and 50 parts by weight of water.

A sheet was fabricated using this impregnating varnish by thermal curing at 160 degrees C. for 2 hours. Other fabricating conditions of the sheet are the same as those of Example 1.

In order to evaluate the extraction characteristics of the sheet in the refrigerant/refrigerating machine oil refrigerant system, an extraction characteristics test against the refrigerant system was conducted using, same as Example 1, methanol.

Additionally, a similar test was conducted to impregnating varnish that had been stored for one month under a temperature condition of 40 degrees C.

The results are shown in Table 1.

Further, after the magnet wire 6, which is provided in the stator 21 of the hermetic electric compressor, was impregnated with the impregnating varnish that was obtained in Comparative Example 1 and then was thermal cured at 160 degrees C. for 2 hours, a real machine (the hermetic electric compressor shown in FIGS. 1 and 2) was fabricated by incorporating the stator 21 into the hermetic electric compressor.

In order to ascertain whether there has been any appearance change of the coil and any formation of sludge in the refrigerant/refrigerating machine oil refrigerant system of the real machine, the real machine was incorporated in a simulated refrigeration cycle for evaluation. Furthermore, an accelerated reliability test of 2000 hours was run after charging 4 kg of R-407C (a ternary refrigerant mixture of R-134a/R-125/R-32), which is the same hydrofluorocarbon used in Example 1, as refrigerant and 1.6 kg of compatible type ester oil (manufactured by Nippon Oil Co., Ltd.; Freol Alpha) as refrigerating machine oil in the simulated refrigeration cycle.

After the 2000-hour accelerated reliability test was run, a flow reduction rate of a throttled portion of an expansion valve was measured and the appearance change of the expansion valve and the pipeline was visually checked, as in the same manner as Example 1. The results are shown in Table 2.

Comparative Example 2

Impregnating varnish (water-dispersible varnish) was obtained by mixing 30 parts by weight of epoxy acrylate (bisphenol A type, two acryloyl groups in one molecule, number average molecular weight of approximately 500) as base polymer; 10 parts by weight of 2-hydroxyethyl methacrylate and 15 parts by weight of trimethyloipropanetrimethacrylate as reactive diluent; 0.5 part by weight of t-butyl peroxybenzoate as organic peroxide; 0.05 part by weight of cobalt naphthenate as organic acid metal salt; 5 parts by weight of surfactant; and 40 parts by weight of water.

A sheet was fabricated using this impregnating varnish by thermal curing at 190 degrees C. for 3 hours. Other fabricating conditions of the sheet are the same as those of Example 1.

In order to evaluate the extraction characteristics of the sheet in the refrigerant/refrigerating machine oil refrigerant system, an extraction characteristics test against the refrigerant system was conducted using, same as Example 1, methanol.

Additionally, a similar test was conducted to impregnating varnish that had been stored for one month under a temperature condition of 40 degrees C.

The results are shown in Table 1.

Further, after the magnet wire 6, which is provided in the stator 21 of the hermetic electric compressor, was impregnated with the impregnating varnish that was obtained in Comparative Example 2 and then was thermal cured at 190 degrees C. for 3 hours, a real machine (the hermetic electric compressor shown in FIGS. 1 and 2) was fabricated by incorporating the stator 21 into the hermetic electric compressor.

In order to ascertain whether there has been any appearance change of the coil and any formation of sludge in the refrigerant/refrigerating machine oil refrigerant system of the real machine, the real machine was incorporated in a simulated refrigeration cycle for evaluation. Furthermore, an accelerated reliability test of 2000 hours was run after charging 4 kg of R-744 ($CO_2$) as refrigerant and 1.6 kg of polyvinyl ether as refrigerating machine oil in the simulated refrigeration cycle.

After the 2000-hour accelerated reliability test was run, a flow reduction rate of a throttled portion of an expansion valve was measured and the appearance change of the expansion valve and the pipeline was visually checked, as in the same manner as Example 1. The results are shown in Table 2.

Comparative Example 3

Using an impregnating varnish obtained in the same manner as Comparative Example 2, a sheet was fabricated by thermal curing at 150 degrees C. for 0.25 hours. Other fabricating conditions of the sheet are the same as those of Example 1.

In order to evaluate the extraction characteristics of the sheet in the refrigerant/refrigerating machine oil refrigerant system, an extraction characteristics test against the refrigerant system was conducted using, same as Example 1, methanol.

Additionally, a similar test was conducted to impregnating varnish that had been stored for one month under a temperature condition of 40 degrees C.

The results are shown in Table 1.

Further, after the magnet wire 6, which is provided in the stator 21 of the hermetic electric compressor, was impregnated with the impregnating varnish that was obtained in the same manner as Comparative Example 2 and then was thermal cured at 150 degrees C. for 0.25 hours, a real machine (the hermetic electric compressor shown in FIGS. 1 and 2) was fabricated by incorporating the stator 21 into the hermetic electric compressor.

In order to ascertain whether there has been any appearance change of the coil and any formation of sludge in the refrigerant/refrigerating machine oil refrigerant system of the real machine, the real machine was incorporated in a simulated refrigeration cycle for evaluation. Furthermore, an accelerated reliability test of 2000 hours was run after charging 4 kg of R-290 as refrigerant and 1.6 kg of polyalkylene glycol as refrigerating machine oil in the simulated refrigeration cycle.

After the 2000-hour accelerated reliability test was run, a flow reduction rate of a throttled portion of an expansion valve was measured and the appearance change of the expansion valve and the pipeline was visually checked, as in the same manner as Example 1. The results are shown in Table 2.

Comparative Example 4

Using an impregnating varnish obtained in the same manner as Comparative Example 2, a sheet was fabricated by thermal curing at 125 degrees C. for 5 hours. Other fabricating conditions of the sheet are the same as those of Example 1.

In order to evaluate the extraction characteristics of the sheet in the refrigerant/refrigerating machine oil refrigerant system, an extraction characteristics test against the refrigerant system was conducted using, same as Example 1, methanol.

Additionally, a similar test was conducted to impregnating varnish that had been stored for one month under a temperature condition of 40 degrees C.

The results are shown in Table 1.

Further, after the magnet wire 6, which is provided in the stator 21 of the hermetic electric compressor, was impregnated with the impregnating varnish that was obtained in the same manner as Comparative Example 2 and then was thermal cured at 125 degrees C. for 5 hours, a real machine (the hermetic electric compressor shown in FIGS. 1 and 2) was fabricated by incorporating the stator 21 into the hermetic electric compressor.

In order to ascertain whether there has been any appearance change of the coil and any formation of sludge in the refrigerant/refrigerating machine oil refrigerant system of the real machine, the real machine was incorporated in a simulated refrigeration cycle for evaluation. Furthermore, an accelerated reliability test of 2000 hours was run after charging 4 kg of R-1270 as refrigerant and 1.6 kg of polyalkylene glycol as refrigerating machine oil in the simulated refrigeration cycle.

After the 2000-hour accelerated reliability test was run, a flow reduction rate of a throttled portion of an expansion valve was measured and the appearance change of the expansion valve and the pipeline was visually checked, as in the same manner as Example 1. The results are shown in Table 2.

Comparative Example 5

Using impregnating varnish obtained in the same manner as Comparative Example 2, a sheet was fabricated by thermal curing at 150 degrees C. for 9 hours. Other fabricating conditions of the sheet are the same as those of Example 1.

In order to evaluate the extraction characteristics of the sheet in the refrigerant/refrigerating machine oil refrigerant system, an extraction characteristics test against the refrigerant system was conducted using, same as Example 1, methanol.

Additionally, a similar test was conducted to impregnating varnish that had been stored for one month under a temperature condition of 40 degrees C.

The results are shown in Table 1.

Further, after the magnet wire 6, which is provided in the stator 21 of the hermetic electric compressor, was impregnated with the impregnating varnish that was obtained in the same manner as Comparative Example 2 and then was thermal cured at 150 degrees C. for 9 hours, a real machine (the hermetic electric compressor shown in FIGS. 1 and 2) was fabricated by incorporating the stator 21 into the hermetic electric compressor.

In order to ascertain whether there has been any appearance change of the coil and any formation of sludge in the refrigerant/refrigerating machine oil refrigerant system of the real machine, the real machine was incorporated in a simulated refrigeration cycle for evaluation. Furthermore, an accelerated reliability test of 2000 hours was run after charging 4 kg of R-717 (ammonia) as refrigerant and 1.6 kg of polyvinyl ether as refrigerating machine oil in the simulated refrigeration cycle.

After the 2000-hour accelerated reliability test was run, a flow reduction rate of a throttled portion of an expansion valve was measured and the appearance change of the expansion valve and the pipeline was visually checked, as in the same manner as Example 1. The results are shown in Table 2.

Comparative Example 6

Impregnating varnish (water-dispersible varnish) was obtained by mixing 5 parts by weight of epoxy acrylate (novolac type, two acryloyl groups in one molecule, number average molecular weight of approximately 850) as base polymer; 37 parts by weight of 2-hydroxyethyl methacrylate and 15 parts by weight of trimethylolpropanetrimethacrylate as reactive diluent; 0.5 part by weight of t-butyl peroxybenzoate as organic peroxide; 0.05 part by weight of cobalt naphthenate as organic acid metal salt; 3 parts by weight of surfactant; and 40 parts by weight of water.

A sheet was fabricated using this impregnating varnish by thermal curing at 155 degrees C. for 3 hours. Other fabricating conditions of the sheet are the same as those of Example 1.

In order to evaluate the extraction characteristics of the sheet in the refrigerant/refrigerating machine oil refrigerant system, an extraction characteristics test against the refrigerant system was conducted using, same as Example 1, methanol.

Additionally, a similar test was conducted to impregnating varnish that had been stored for one month under a temperature condition of 40 degrees C.

The results are shown in Table 1.

Further, after the magnet wire 6, which is provided in the stator 21 of the hermetic electric compressor, was impregnated with the impregnating varnish that was obtained in Comparative Example 6 and then was thermal cured at 155 degrees C. for 3 hours, a real machine (the hermetic electric compressor shown in FIGS. 1 and 2) was fabricated by incorporating the stator 21 into the hermetic electric compressor.

In order to ascertain whether there has been any appearance change of the coil and any formation of sludge in the refrigerant/refrigerating machine oil refrigerant system of the real machine, the real machine was incorporated in a simulated refrigeration cycle for evaluation. Furthermore, an accelerated reliability test of 2000 hours was run after charging 4 kg of R-407, which is the same R-407 used in Example 1, as refrigerant and 1.5 kg of paraffinic mineral oil (manufactured by Mitsubishi Oil Co., Ltd.; DIAMOND FREEZE) as refrigerating machine oil in the simulated refrigeration cycle.

After the 2000-hour accelerated reliability test was run, a flow reduction rate of a throttled portion of an expansion valve was measured and the appearance change of the expansion valve and the pipeline was visually checked, as in the same manner as Example 1. The results are shown in Table 2.

Comparative Example 7

Impregnating varnish (water-dispersible varnish) was obtained by mixing 47 parts by weight of epoxy acrylate (bisphenol A type, two acryloyl groups in one molecule, number average molecular weight of approximately 600) as base polymer; 2 parts by weight of 2-hydroxyethyl methacrylate as reactive diluent; 0.5 part by weight of t-butyl peroxybenzoate as organic peroxide; 0.05 part by weight of cobalt naphthenate as organic acid metal salt; 1 parts by weight of surfactant; and 50 parts by weight of water.

A sheet was fabricated using this impregnating varnish, as in the same manner as Example 1.

In order to evaluate the extraction characteristics of the sheet in the refrigerant/refrigerating machine oil refrigerant system, an extraction characteristics test against the refrigerant system was conducted using, same as Example 1, methanol.

Additionally, a similar test was conducted to impregnating varnish that had been stored for one month under a temperature condition of 40 degrees C.

The results are shown in Table 1.

Further, after the magnet wire 6, which is provided in the stator 21 of the hermetic electric compressor, was impregnated with the impregnating varnish that was obtained in Comparative Example 7 and then was thermal cured under the same conditions as Example 1, a real machine (the hermetic electric compressor shown in FIGS. 1 and 2) was fabricated by incorporating the stator 21 into the hermetic electric compressor.

In order to ascertain whether there has been any appearance change of the coil and any formation of sludge in the refrigerant/refrigerating machine oil refrigerant system of the real machine, the real machine was incorporated in a simulated refrigeration cycle for evaluation. Furthermore, an accelerated reliability test of 2000 hours was run after charging 4 kg of R-744 ($CO_2$) as refrigerant and 1.6 kg of polyalkylene glycol as refrigerating machine oil in the simulated refrigeration cycle.

After the 2000-hour accelerated reliability test was run, a flow reduction rate of a throttled portion of an expansion valve was measured and the appearance change of the expansion valve and the pipeline was visually checked, as in the same manner as Example 1. The results are shown in Table 2.

Comparative Example 8

Impregnating varnish (water-dispersible varnish) was obtained by mixing 5 parts by weight of epoxy acrylate (novolac type, two acryloyl groups in one molecule, number average molecular weight of approximately 850) as base polymer; 3 parts by weight of 2-hydroxyethyl methacrylate and 2 parts by weight of trimethylolpropanetrimethacrylate as reactive diluent; 0.5 part by weight of t-butyl peroxybenzoate as organic peroxide; 0.05 part by weight of cobalt naphthenate as organic acid metal salt; 3 parts by weight of surfactant; and 87 parts by weight of water.

A sheet was fabricated using this impregnating varnish by thermal curing at 155 degrees C. for 3 hours. Other fabricating conditions of the sheet are the same as those of Example 1.

In order to evaluate the extraction characteristics of the sheet in the refrigerant/refrigerating machine oil refrigerant system, an extraction characteristics test against the refrigerant system was conducted using, same as Example 1, methanol.

Additionally, a similar test was conducted to impregnating varnish that had been stored for one month under a temperature condition of 40 degrees C.

The results are shown in Table 1.

Further, after the magnet wire 6, which is provided in the stator 21 of the hermetic electric compressor, was impregnated with the impregnating varnish that was obtained in Comparative Example 8 and then was thermal cured at 155 degrees C. for 3 hours, a real machine (the hermetic electric compressor shown in FIGS. 1 and 2) was fabricated by incorporating the stator 21 into the hermetic electric compressor.

In order to ascertain whether there has been any appearance change of the coil and any formation of sludge in the refrigerant/refrigerating machine oil refrigerant system of the real machine, the real machine was incorporated in a simulated refrigeration cycle for evaluation. Furthermore, an accelerated reliability test of 2000 hours was run after charging 4 kg of R-290 as refrigerant and 1.6 kg of polyvinyl ether as refrigerating machine oil in the simulated refrigeration cycle.

After the 2000-hour accelerated reliability test was run, a flow reduction rate of a throttled portion of an expansion valve was measured and the appearance change of the expansion valve and the pipeline was visually checked, as in the same manner as Example 1. The results are shown in Table 2.

Comparative Example 9

Impregnating varnish (water-dispersible varnish) was obtained by mixing 50 parts by weight of epoxy acrylate (novolac type, two acryloyl groups in one molecule, number average molecular weight of approximately 600) as base polymer; 25 parts by weight of 2-hydroxyethyl methacrylate and 20 parts by weight of trimethyloipropanetrimethacrylate as reactive diluent; 0.5 part by weight of t-butyl peroxybenzoate as organic peroxide; 0.05 part by weight of cobalt naphthenate as organic acid metal salt; 1 parts by weight of surfactant; and 4 parts by weight of water.

A sheet was fabricated using this impregnating varnish by thermal curing at 160 degrees C. for 3 hours. Other fabricating conditions of the sheet are the same as those of Example 1.

In order to evaluate the extraction characteristics of the sheet in the refrigerant/refrigerating machine oil refrigerant system, an extraction characteristics test against the refrigerant system was conducted using, same as Example 1, methanol.

Additionally, a similar test was conducted to impregnating varnish that had been stored for one month under a temperature condition of 40 degrees C.

The results are shown in Table 1.

Further, after the magnet wire 6, which is provided in the stator 21 of the hermetic electric compressor, was impregnated with the impregnating varnish that was obtained in Comparative Example 1 and then was thermal cured at 160 degrees C. for 3 hours, a real machine (the hermetic electric compressor shown in FIGS. 1 and 2) was fabricated by incorporating the stator 21 into the hermetic electric compressor.

In order to ascertain whether there has been any appearance change of the coil and any formation of sludge in the refrigerant/refrigerating machine oil refrigerant system of the real machine, the real machine was incorporated in a simulated refrigeration cycle for evaluation. Furthermore, an accelerated reliability test of 2000 hours was run after charging 4 kg of R-1270 as refrigerant and 1.6 kg of polyvinyl ether as refrigerating machine oil in the simulated refrigeration cycle.

After the 2000-hour accelerated reliability test was run, a flow reduction rate of a throttled portion of an expansion valve was measured and the appearance change of the expansion valve and the pipeline was visually checked, as in the same manner as Example 1. The results are shown in Table 2.

Comparative Example 10

Impregnating varnish (water-dispersible varnish) was obtained by mixing 25 parts by weight of epoxy acrylate (novolac type, two acryloyl groups in one molecule, number average molecular weight of approximately 400) as base polymer; 20 parts by weight of 2-hydroxyethyl methacrylate and 15 parts by weight of trimethylolpropanetrimethacrylate as reactive diluent; 0.5 part by weight of t-butyl peroxybenzoate as organic peroxide; 0.05 part by weight of cobalt naphthenate as organic acid metal salt; 25 parts by weight of surfactant; and 15 parts by weight of water.

A sheet was fabricated using this impregnating varnish by thermal curing at 160 degrees C. for 3 hours. Other fabricating conditions of the sheet are the same as those of Example 1.

In order to evaluate the extraction characteristics of the sheet in the refrigerant/refrigerating machine oil refrigerant system, an extraction characteristics test against the refrigerant system was conducted using, same as Example 1, methanol.

Additionally, a similar test was conducted to impregnating varnish that had been stored for one month under a temperature condition of 40 degrees C.

The results are shown in Table 1.

Further, after the magnet wire 6, which is provided in the stator 21 of the hermetic electric compressor, was impregnated with the impregnating varnish that was obtained in Comparative Example 10 and then was thermal cured at 150 degrees C. for 2 hours, a real machine (the hermetic electric compressor shown in FIGS. 1 and 2) was fabricated by incorporating the stator 21 into the hermetic electric compressor.

In order to ascertain whether there has been any appearance change of the coil and any formation of sludge in the refrigerant/refrigerating machine oil refrigerant system of the real machine, the real machine was incorporated in a simulated refrigeration cycle for evaluation. Furthermore, an accelerated reliability test of 2000 hours was run after charging 4 kg of R-717 (ammonia) as refrigerant and 1.6 kg of polyalkylene glycol as refrigerating machine oil in the simulated refrigeration cycle.

After the 2000-hour accelerated reliability test was run, a flow reduction rate of a throttled portion of an expansion valve was measured and the appearance change of the expansion valve and the pipeline was visually checked, as in the same manner as Example 1. The results are shown in Table 2.

TABLE 1

|  | Rate of extraction (%) when using varnish before storage | Rate of extraction (%) when using varnish stored for 1-month |
|---|---|---|
| Example |  |  |
| 1 | 0.2 | 0.2 |
| 2 | 0.4 | 0.4 |
| 3 | 0.3 | 0.3 |
| 4 | 0.3 | 0.3 |
| 5 | 0.2 | 0.2 |
| 6 | 0.3 | 0.3 |
| 7 | 0.4 | 0.4 |
| 8 | 0.4 | 0.4 |
| 9 | 0.5 | 0.5 |
| 10 | 0.4 | 0.4 |
| Comparative Example |  |  |
| 1 | 3.5 | 4.3 |
| 2 | Not measurable | Not measurable |
| 3 | 4.3 | 5.2 |
| 4 | 6.8 | 9.3 |
| 5 | Not measurable | Not measurable |
| 6 | 5.9 | 8.5 |
| 7 | Not measurable | Not measurable |
| 8 | Not measurable | Not measurable |
| 9 | 7.6 | 16.3 |
| 10 | 6.9 | 12.6 |

TABLE 2

|  | Refrigerant and Refrigerant oil | Results of accelerated reliability test | |
|---|---|---|---|
|  |  | Flow reduction rate at a throttled portion (%) | Visual inspection |
| Example |  |  |  |
| 1 | R-407C and Ester oil | 98 | ○ |
| 2 | $CO_2$ and Polyalkylene glycol | 97 | ○ |
| 3 | R-290 and Polyvinyl ether | 97 | ○ |
| 4 | R-1270 and Polyalkylene glycol | 99 | ○ |
| 5 | Ammonia and Polyvinyl ether | 96 | ○ |
| 6 | R-407C and Paraffinic mineral oil + alkylbenzene-based oil | 98 | ○ |
| 7 | $CO_2$ and Polyvinyl ether | 98 | ○ |
| 8 | R-290 and Polyalkylene glycol | 99 | ○ |
| 9 | R-1270 and Polyvinyl ether | 98 | ○ |
| 10 | Ammonia and Polyalkylene glycol | 97 | ○ |
| Comparative Example |  |  |  |
| 1 | R-407C and Ester oil | 87 | Δ |
| 2 | $CO_2$ and Polyvinyl ether | Not evaluable | x |
| 3 | R-290 and Polyalkylene glycol | 89 | x |
| 4 | R-1270 and Polyalkylene glycol | 86 | Δ |
| 5 | Ammonia and Polyvinyl ether | Not evaluable | x |
| 6 | R-407C and Paraffinic mineral oil + alkylbenzene-based oil | 88 | Δ |
| 7 | $CO_2$ and Polyalkylene glycol | Not evaluable | x |
| 8 | R-290 and Polyvinyl ether | Not evaluable | x |
| 9 | R-1270 and Polyvinyl ether | 86 | Δ |
| 10 | Ammonia and Polyalkylene glycol | 88 | x |

The results shown in Tables 1 and 2 indicate that the flow reduction rates in the throttled portion using varnish before being stored and after being stored for one month are lower in all of the Examples from 1 to 10 when compared with Comparative Examples 1 to 10. Additionally, in all of the Examples from 1 to 10, there was no appearance change whatsoever in the expansion valve and the pipeline. From these results, it is found that in all the Examples from 1 to 10, compared with Comparative Examples 1 to 10, extraction rates are lower, and that the accelerated reliability are markedly satisfactory.

In contrast,

In Comparative Example 1, since styrene was contained in the reactive diluent, the amount of extraction was large and a large amount of sludge was formed in the expansion valve and the pipeline, thus showing change in appearance. Further, the flow reduction rate in the throttled portion was considerably large.

In Comparative Example 2, since the curing temperature was high, crack occurred in the cured varnish during fabrication of the sheet and the real machine. Thus, it was not possible to evaluate the flow reduction rate in the throttled portion of the expansion valve, the extraction rate, and the appearance.

In Comparative Example 3, since the curing time was short, there was a large amount of extraction from the uncured portion of the varnish, and thus there was change in appearance.

In Comparative Example 4, since the curing temperature was low, there was a large amount of extraction from the uncured portion of the varnish, and, thus, there was change in appearance.

In Comparative Example 5, since the curing time was long, crack occurred in the cured varnish during fabrication of the sheet and the real machine. Thus, it was not possible to evaluate the flow reduction rate in the throttled portion of the expansion valve, the extraction rate, and the appearance.

In Comparative Example 6, since the content rate of the thermosetting resin was low, there was a large amount of extraction from the cured varnish, and, thus, there was change in appearance.

In Comparative Example 7, since the content rate of the thermosetting resin was high, the viscosity of the varnish was high. Thus, the impregnating ability of the impregnating varnish was poor and it was not possible to fabricate a real machine.

In Comparative Example 8, since the content rate of water was high, the stability of the varnish was low. Thus, the impregnating varnish could not be coated onto the magnet wire and it was not possible to fabricate a real machine.

In Comparative Example 9, since the content rate of water was low, the stability of the varnish was low and there was a large amount of extraction from the uncured portion of the varnish, and, thus, there was change in appearance.

In Comparative Example 10, since the content rate of surfactant was high, the stability of the varnish was low and there was a large amount of extraction from the uncured portion of the varnish, and, thus, there was change in appearance.

As above-described, since the impregnating varnish according to the invention is a water-dispersible type, volatile components or the like during thermal curing can be reduced in the alternative refrigerant/refrigerating machine oil refrigerant system or the natural refrigerant/refrigerating machine oil refrigerant system. Further, since the impregnating varnish is a water-dispersible type that is a mixture of a specific thermosetting resin as a base polymer, a specific vinyl monomer as reactive diluent, organic peroxide as reaction initiator, and water, cured varnish exhibiting excellent resistance (little deterioration suppressing deterioration of mechanical strength, low extractability to the refrigerant system, low eduction from the refrigerant system, and the like.) to the alternative refrigerant/refrigerating machine oil refrigerant system or the natural refrigerant/refrigerating machine oil refrigerant system can be obtained.

Furthermore, by using the water-dispersible varnish according to the embodiment, a hermetic electric compressor having a magnet wire 6 that is insulated and fixed by the cured varnish having the above advantages can be obtained, and a refrigeration and air-conditioning apparatus equipped with this compressor can be obtained. Therefore, an electric compressor that is capable of suppressing clogging of the capillary tube, expansion valve, and the like can be obtained, and a refrigeration and air-conditioning apparatus equipped with this compressor can be obtained.

Note that the water-dispersible varnish according to the embodiment is not limited to hermetic electric compressors, and it goes without saying that, it can be used in semi-hermetic electric compressors and the like.

Reference Signs List

1. hermetic vessel; 2. motor component; 3. compression component; 4. refrigerating machine oil; 5. crankshaft; 6. magnet wire; 7. sealed power terminal; 8. core; 9. slot; 10. insulating film; 11. binding thread; 12. impregnating varnish; 21. stator; 22. rotor.

The invention claimed is:

1. A water-dispersible varnish, comprising:
    an epoxy acrylate resin, as a thermosetting resin, comprising two or more (meth) acryloyl groups in one molecule;
    at least one reactive diluent selected from the group consisting of a vinyl monomer comprising an ether bond, a vinyl monomer comprising an ester bond, a 1-alkylvinyl monomer comprising an ether bond, and a 1-alkylvinyl monomer comprising an ester bond;
    an organic peroxide as a reaction initiator;
    water, and
    a water-soluble surfactant,
    wherein the epoxy acrylate resin is of any of Formulas (I) to (III):

wherein $R^1, R^2, R^3, R^6, R^7, R^8, R^{10}, R^{11}$, and $R^{12}$ are each independently H or $CH_3$;

$R^4$ is a group of formula:

n is an integer from 1 to 6;

$R^9$ is a group of formula:

m is an integer from 1 to 6;

$R^{13}, R^{14}$, and $R^{15}$ are each independently a group of formula:

each $R^5$ is independently H or $CH_3$; and p is an integer from 1 to 6, and an amount of the water-soluble surfactant is from 0.5 to 20 parts by weight, relative to 100 parts by weight of the base polymer.

2. The water-dispersible varnish of claim 1,
    wherein the at least one reactive diluent comprises a polyfunctional vinyl monomer comprising three or more (meth) acryloyl groups or allyl groups in one molecule.

3. The water-dispersible varnish of claim 1, wherein a weight ratio of the thermosetting resin to the at least one reactive diluent is from 10:90 to 90:10.

4. The water-dispersible varnish of claim 1, further comprising an organic acid metal salt.

5. The water-dispersible varnish of claim 1, wherein the reaction initiator comprises a photoinitiator.

6. The varnish of claim 1, wherein a weight ratio of organic compounds to water is from 15:85 to 70:30.

7. The water-dispersible varnish of claim 1, wherein the at least one reactive diluent comprises a 1-alkylvinyl monomer of Formula (IV):

(IV)

$R^{16}$ is a hydrogen atom or an alkyl group having from one to five carbon atoms,
$R^{17}$ is $-(CH_2)_q-$ or $-(CH(R^{18})O)_r-$
q is an integer of from 1 to 6,
$R^{18}$ is a hydrogen atom or an alkyl group having from one to five carbon atoms,
r is an integer of from 1 to 6,
X is H, OH, or $OCO(R^{19})$
$R^{19}$ is an alkyl group having from one to five carbon atoms, a vinyl group, or a 1-alkylvinyl group comprising an alkyl group having from one to five carbon atoms.

8. The water-dispersible varnish of claim 1, wherein the at least one reactive diluent comprises 2-hydroxyethyl (meth) acrylate, hydroxypropyl (meth) acrylate, or both.

9. The water-dispersible varnish of claim 3, wherein the weight ratio of the thermosetting resin to the at least one reactive diluent is from 30:70 to 70:30.

10. The water-dispersible varnish of claim 2, wherein the at least one reactive diluent comprises a polyfunctional vinyl monomer comprising from three to six (meth) acryloyl groups or allyl groups in one molecule.

11. The water-dispersible varnish of claim 1, wherein the organic peroxide comprises perhexyl, acyl peroxide, peracid ester, organic hydroperoxide, dialkyl peroxide, or a combination thereof.

12. The water-dispersible varnish of claim 11, wherein the organic peroxide comprises t-hexyl hydroperoxide, benzoyl peroxide, t-butyl peroxybenzoate, tetramethylbutyl hydroperoxide, dicumyl peroxide, or a combination thereof.

13. The water-dispersible varnish of claim 1, wherein an amount of the organic peroxide in the water-dispersible varnish is from 0.05% to 5% by weight.

14. The water-dispersible varnish of claim 13, wherein the amount of the organic peroxide in the water-dispersible varnish is from 0.3% to 3% by weight.

15. The water-dispersible varnish of claim 4, wherein the organic acid metal salt comprises:
at least one organic acid selected from the group consisting of octylic acid and naphthenic acid, and
at least one metal selected from the group consisting of Co, Mn, Sn, Ni, Zn, Pb, Cr, and Fe.

16. The water-dispersible varnish of claim 4, wherein an amount of the organic acid metal salt in the water-dispersible varnish is from 0.015% to 3% by weight.

17. The water-dispersible varnish of claim 16, wherein the amount of the organic acid metal salt in the water-dispersible varnish is from 0.03% to 1.5% by weight.

18. The water-dispersible varnish of claim 5, wherein an amount of the photoinitiator in the water-dispersible varnish is from 0.2 to 15% by weight.

* * * * *